(12) United States Patent
Matsunaga

(10) Patent No.: US 6,510,684 B2
(45) Date of Patent: Jan. 28, 2003

(54) GAS TURBINE ENGINE

(75) Inventor: Minoru Matsunaga, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/867,769

(22) Filed: May 31, 2001

(65) Prior Publication Data
US 2002/0012588 A1 Jan. 31, 2002

(30) Foreign Application Priority Data
May 31, 2000 (JP) ........................................ 2000-166437

(51) Int. Cl.[7] .............................. F02C 7/16; F02C 7/08
(52) U.S. Cl. ..................... 60/39.511; 60/751; 60/730; 60/806; 415/114; 415/178
(58) Field of Search .......................... 60/730, 728, 751, 60/39.511, 806, 39.83; 415/114, 175, 176, 177, 178

(56) References Cited

U.S. PATENT DOCUMENTS

| | | | | |
|---|---|---|---|---|
| 3,283,497 A | * | 11/1966 | Kaplan | 60/751 |
| 3,355,883 A | * | 12/1967 | Beam, Jr. | 60/806 |
| 3,621,908 A | * | 11/1971 | Pravda | 60/726 |
| 3,651,645 A | * | 3/1972 | Grab | 60/728 |
| 3,978,660 A | * | 9/1976 | Laing | 60/39.511 |
| 4,120,150 A | * | 10/1978 | Wakeman | 60/728 |
| 4,455,121 A | * | 6/1984 | Jen | 60/751 |
| 5,626,018 A | * | 5/1997 | Hatfield | 415/179 |
| 6,295,803 B1 | * | 10/2001 | Bancalari | 60/806 |

FOREIGN PATENT DOCUMENTS

JP 11-117810 4/1999

* cited by examiner

Primary Examiner—Ted Kim
(74) Attorney, Agent, or Firm—Arent Fox Kintner Plotkin & Kahn, PLLC.

(57) ABSTRACT

A thermal insulator between the turbine and the compressor of a gas turbine engine is provided and at the same time it enables the air that has passed through the compressor to be heated by the heat of the hot turbine. A gas turbine engine comprises a centrifugal compressor for compressing air that is drawn or sucked into the compressor, a compressed air passage supplying the air compressed by the compressor to a burner, and a turbine driven by means of combustion gas generated in the burner. The compressor and the turbine are provided on a rotating shaft adjacent to each other in the axial direction. Evaporation sections on the radially inner side of a plurality of heat pipes provided in a radial form face towards the outer periphery of the rotating shaft between the compressor and the turbine, and condensation sections on the radially outer side of the heat pipes face towards the compressed air passage.

11 Claims, 16 Drawing Sheets

GAS TURBINE ENGINE

BACKGROUND OF THE INVENTION

1. Field of the Invention

The present invention relates to a gas turbine engine comprising a centrifugal compressor for compressing air that is drawn or sucked into the compressor, a compressed air passage for supplying the air compressed by the compressor to a burner, and a turbine driven by means of combustion gas generated in the burner. The compressor and the turbine are positioned on a rotating shaft adjacent to each other in the axial direction.

2. Description of the Prior Art

Japanese Patent Application Laid-open No. 11-117810 discloses an arrangement in which, in order to prevent curvature in a rotor system due to a difference in temperature caused by natural convection of the air inside a gas turbine engine after operation of the engine is stopped, a hollow cylindrical heat pipe cover surrounding a high temperature part and a low temperature part of the engine, is provided to eliminate the difference in temperature.

In a small-sized gas turbine engine, since the compressor and the turbine are placed to be extremely close to each other in the axial direction of the rotating shaft, the heat on the turbine side, through which hot combustion gas is passing, is transmitted directly to the compressor side, and the air temperature around the entrance of the compressor increases thereby degrading the air compression performance, which is a problem. Moreover, since the higher the air temperature emitted from the compressor, the higher the fuel burning efficiency of the burner, if a heat exchange can be carried out between the air supplied to the burner and the combustion gas without providing a heat exchanger having a complicated structure, the performance of the gas turbine engine can be enhanced without increasing its size.

SUMMARY OF THE INVENTION

The present invention has been carried out in view of the above-mentioned circumstances, and it is an object of the present invention to provide a thermal insulator between a turbine and a compressor of a gas turbine engine and at the same time enable the air that has passed through the compressor to be heated by the heat of the hot turbine.

In order to achieve the above-mentioned object, there is proposed a gas turbine engine comprising a centrifugal compressor for compressing air that is sucked into the compressor, a compressed air passage supplying the air compressed by the compressor to a burner, and a turbine driven by means of combustion gas generated in the burner. The compressor and the turbine are positioned on a rotating shaft, to be adjacent to each other in the axial direction, wherein evaporation sections on the radially inner side of a plurality of heat pipes provided in a radial form, face towards the outer periphery of the rotating shaft between the compressor and the turbine, and condensation sections on the radially outer side of the heat pipes face towards the compressed air passage.

In accordance with the above-mentioned arrangement, it is possible to absorb the heat on the turbine side by means of the evaporation sections of the heat pipes thus preventing the heat from being transmitted to the compressor side and thereby suppressing degradation in the air compression efficiency of the compressor. Moreover, it is possible to transmit the heat on the turbine side to the compressed air passage via the condensation sections, thereby heating the air passing through the passage to enhance the combustion efficiency in the burner.

In addition, there is proposed a gas turbine engine wherein an air bearing is formed between the inner periphery of the evaporation sections of the heat pipes and the outer periphery of the rotating shaft.

In accordance with the above-mentioned arrangement, oscillation of the rotating shaft can be suppressed by the air bearing and the rotating shaft can rotate smoothly. Moreover, the engine becomes oil-less due to the use of the air bearing and it becomes unnecessary to use accessories such as an oil pump thus further reducing the size.

Further, there is proposed a gas turbine engine wherein a large number of channels inclined towards or orthogonal to the circumferential direction, are formed on the inner periphery of the evaporation sections of the heat pipes.

In accordance with the above-mentioned arrangement, the repulsive force of the air membrane of the air bearing can be increased by the large number of channels formed on the inner periphery of the evaporation sections thus enhancing the performance in supporting the rotating shaft.

Further, there is proposed a gas turbine engine wherein the width of the inner periphery of the evaporation sections of the heat pipes facing the outer periphery of the rotating shaft, is increased in the axial direction of the rotating shaft.

In accordance with the above-mentioned arrangement, since the area over which the outer periphery of the rotating shaft and the inner periphery of the evaporation sections of the heat pipes forming the air bearing face each other increases, the performance in supporting the rotating shaft can be enhanced.

There is also proposed a gas turbine engine wherein the evaporation sections of at least two adjacent heat pipes communicate with each other.

In accordance with the above-mentioned arrangement, the operating fluid is able to move among a plurality of heat pipes and each of the heat pipes can exhibit an equal heat transport performance.

Further, there is proposed a gas turbine engine wherein the evaporation sections of all the heat pipes communicate with each other.

In accordance with the above-mentioned arrangement, the operating fluid is able to move among all of the plurality of heat pipes and each of the heat pipes can exhibit a more equal heat transport performance.

Also, there is proposed a gas turbine engine wherein the condensation sections of the heat pipes in the compressed air passage, form diffusers.

In accordance with the above-mentioned arrangement, since the condensation sections themselves of the heat pipes in the compressed air passage form diffusers, a diffuser function can be exhibited without increasing the number of parts.

Further, there is proposed a gas turbine engine wherein the evaporation sections of the heat pipes extending radially between the compressor and the turbine, are curved in the circumferential direction.

In accordance with the above-mentioned arrangement, the ability to absorb heat can be enhanced by increasing the length of the evaporation sections of the heat pipes and the thermal insulating of the compressor from the turbine can be carried out effectively.

Also, there is proposed a gas turbine engine wherein the condensation sections of the heat pipes in the compressed air passage are curved in the circumferential direction.

In accordance with the above-mentioned arrangement, the heat release performance can be enhanced by increasing the length of the condensation sections of the heat pipes and the air passing through the compressed air passage can be heated effectively.

Still further, there is proposed a gas turbine engine wherein the compressed air passage and the heat pipes are divided into a plurality of modules by a plane that includes the rotating shaft.

In accordance with the above-mentioned arrangement, since the compressed air passage and the heat pipes are divided into a plurality of modules, the ease of assembly when assembling them on the outer periphery of the rotating shaft, can be enhanced.

DETAILED DESCRIPTION OF THE PREFERRED EMBODIMENT

Figure 1:
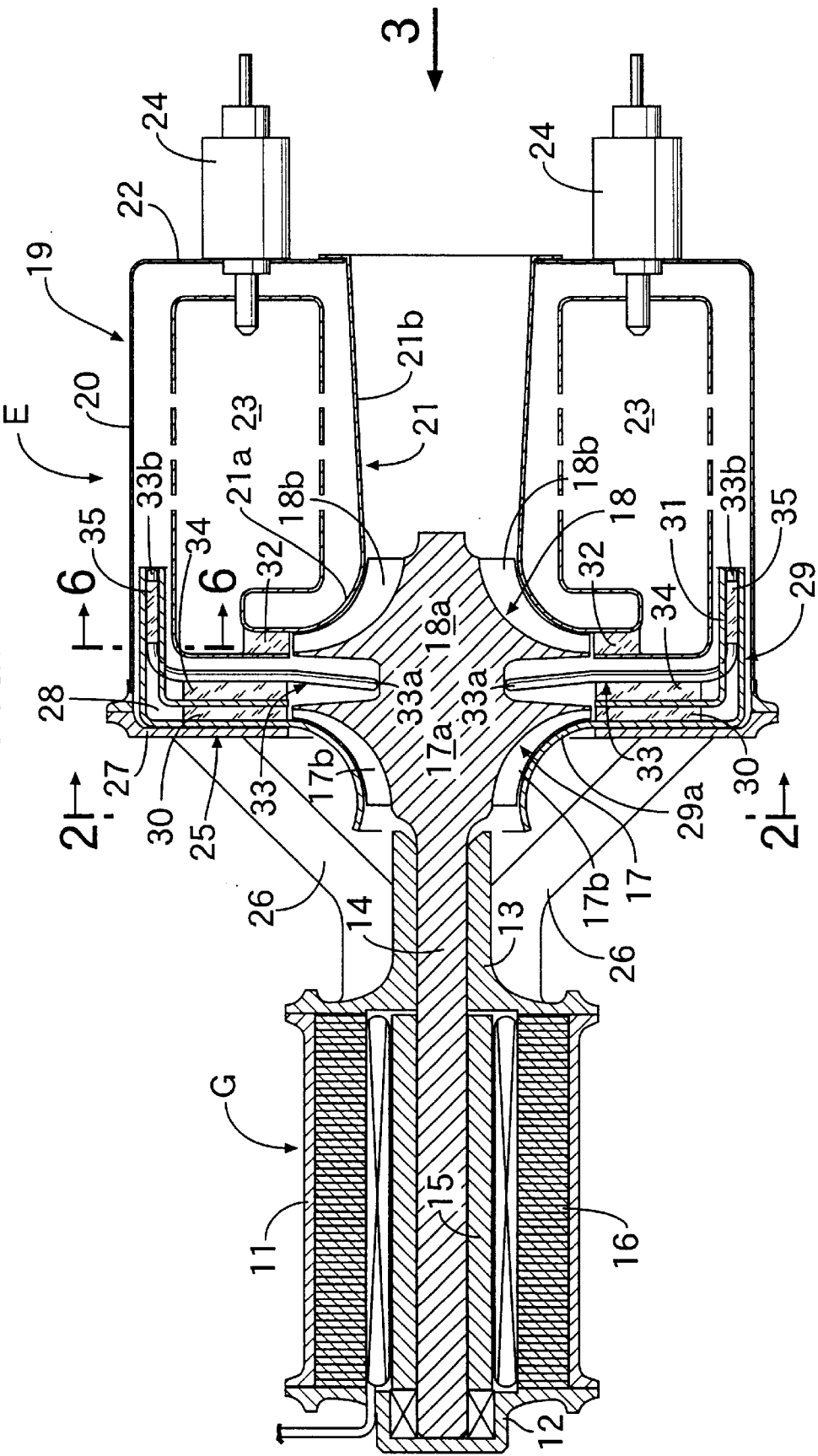
FIG. 1 is a longitudinal section view of a gas turbine of a first embodiment of the present invention.
Figure 2:
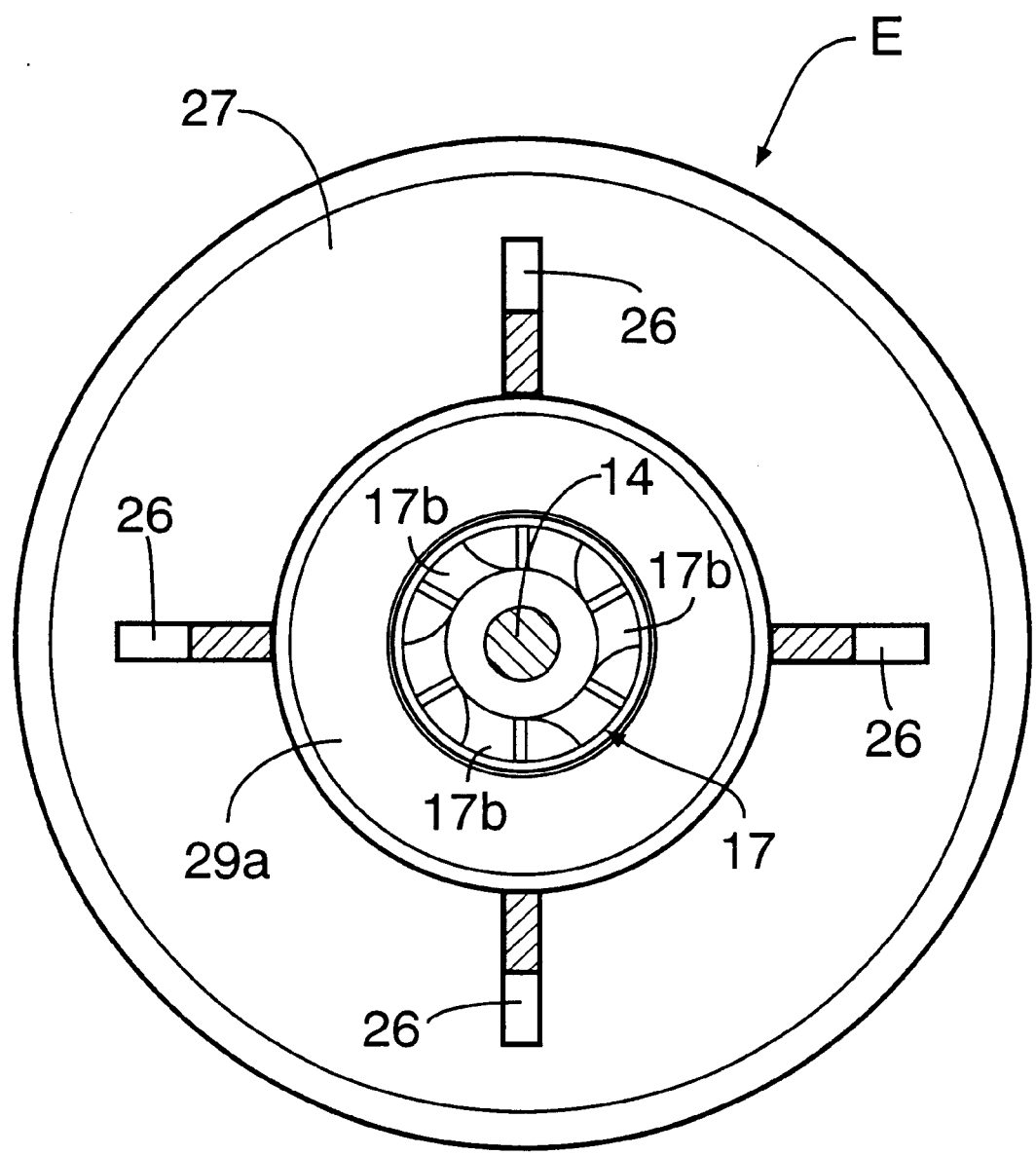
FIG. 2 is a cross-sectional view at line 2—2 in FIG. 1.
Figure 3:
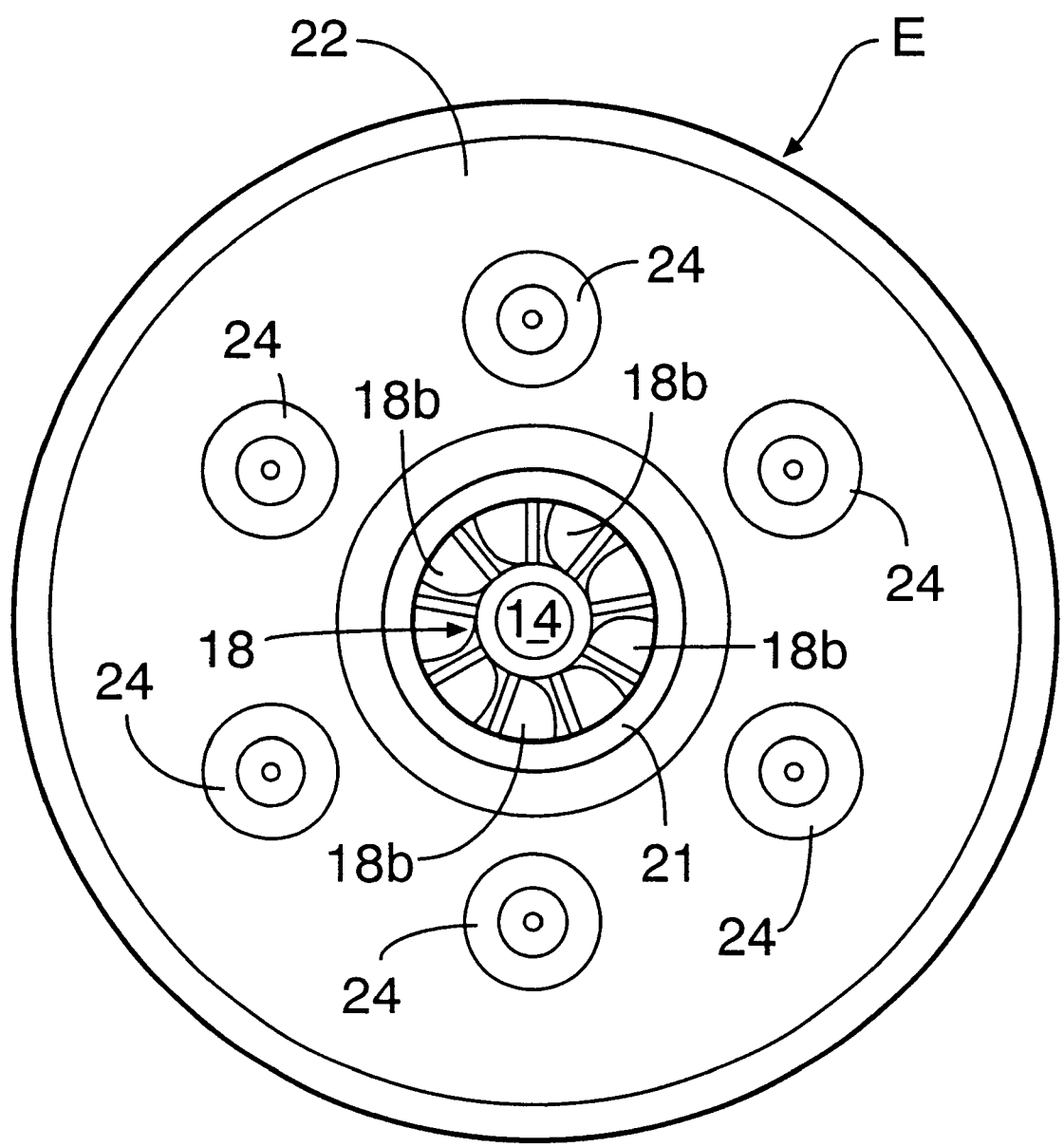
FIG. 3 is a view from arrow 3 in FIG. 1.

As shown in FIGS. 1 to 3, a gas turbine engine E of a first embodiment has an integral generator G, which is a driven device. The generator G comprises a cylindrical main body housing 11, a front cover 12 and a rear cover 13 for covering both the front and rear ends of the main body housing 11, and a rotating shaft 14 supported in the two covers 12 and 13. The outer periphery of a rotor 15 provided on the rotating shaft 14 faces the inner periphery of a stator 16 provided in the main body housing 11, and power is generated by relative rotation between the rotor 15 and the stator 16.

A centrifugal compressor 17 and a centrifugal turbine 18 of the gas turbine engine E are provided integrally on the rotating shaft 14 adjacent to each other in the axial direction, the rotating shaft 14 projecting backwards out of the rear cover 13 of the generator G. The compressor 17 includes a large number of vanes 17b formed radially on the front face of a solid compressor disc 17a, and the turbine 18 includes a large number of vanes 18b formed radially on the rear face of a solid turbine disc 18a.

The gas turbine engine E has a can-annular burner 19. The burner 19 comprises six flame tubes 23 at intervals of 60° inside a space surrounded by an outer peripheral wall 20, an inner peripheral wall 21 and a rear wall 22, and six fuel injection nozzles 24 supported on the rear wall 22 extend inside the corresponding flame tubes 23. A front part of the inner peripheral wall 21 of the burner 19 forms a shroud 21a of the turbine 18 and a rear part of the inner peripheral wall 21 forms an exhaust passage 21b.

Figure 4:
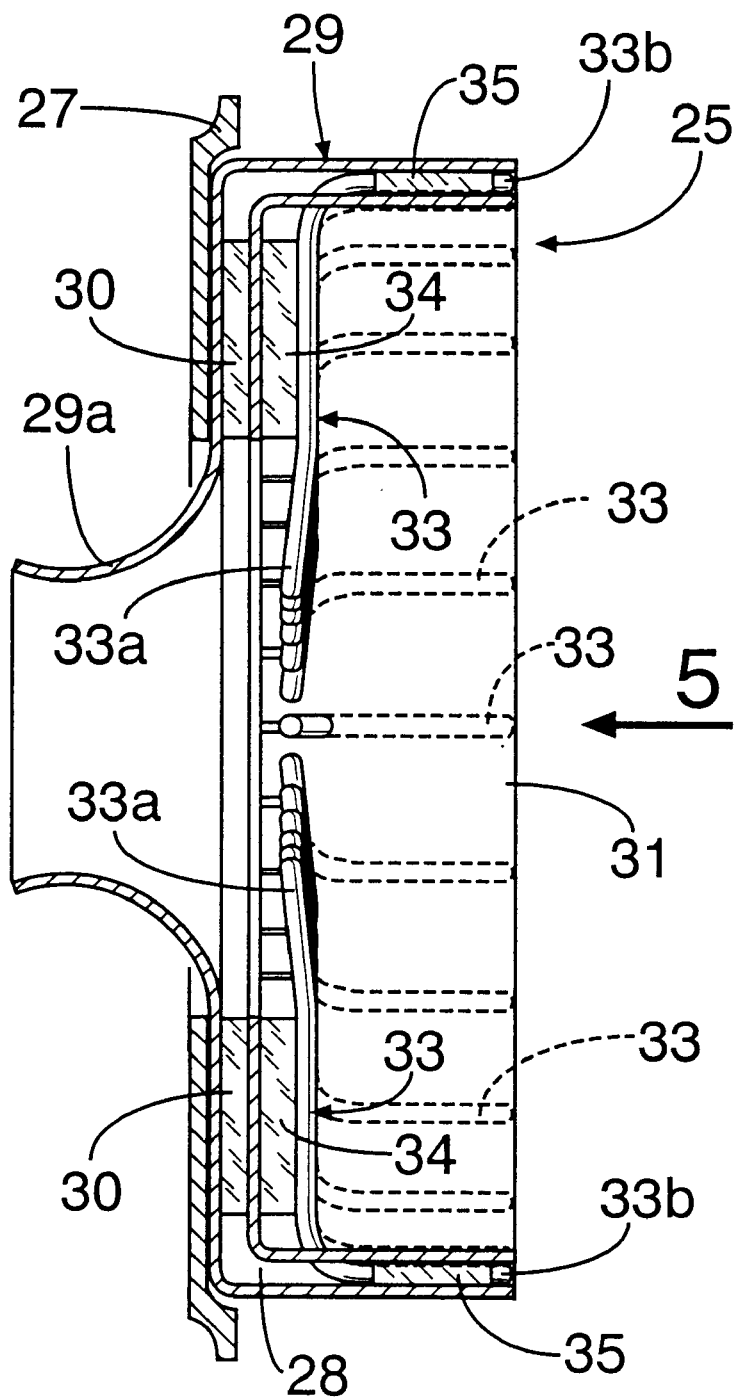
FIG. 4 is a longitudinal section view of a heat exchanger unit.
Figure 5:
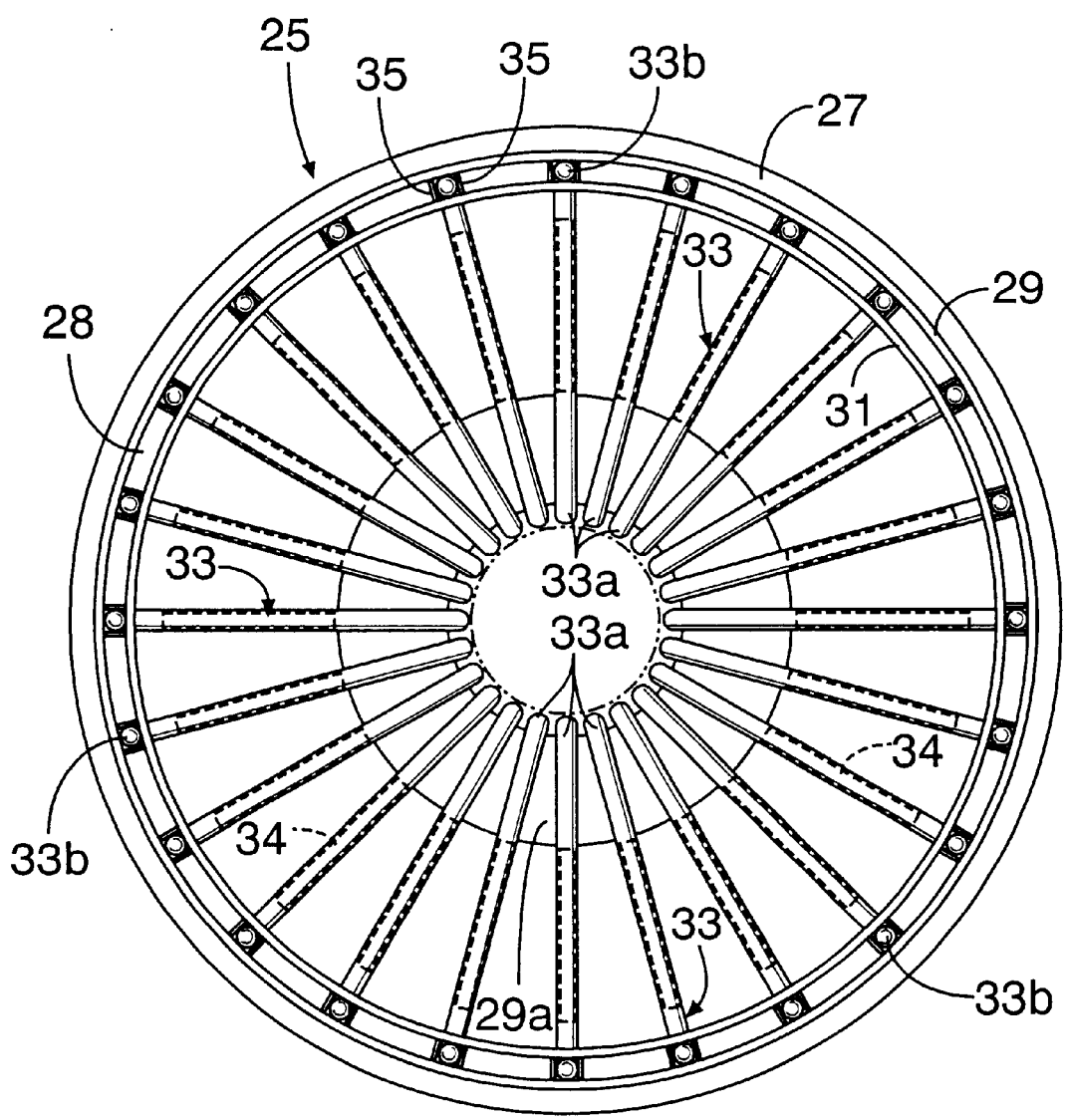
FIG. 5 is a view from arrow 5 in FIG. 4.

A heat pipe unit 25 shown in FIGS. 4 and 5 is supported on the rear ends of four support legs 26 extending backwards from the rear cover 13 of the generator G. The heat pipe unit 25 comprises a substrate 27 bonded to the rear ends of the support legs 26, and an outer wall 29 of a compressed air passage 28 is fixed to the rear face of the substrate 27. A shroud 29a of the compressor 17 is formed integrally on the radially inner side of the outer wall 29 of the compressed air passage 28. An inner wall 31 of the compressed air passage 28 is supported by a large number of diffusers 30 on the rear face of the outer wall 29 of the compressed air passage 28. The compressed air passage 28 defined by the outer wall 29 and the inner wall 31 extends radially outwards from the radially inner end of the compressor 17 and then changes its direction by 90° towards the rear, and its downstream end communicates with the inside of the burner 19. Nozzle guide vanes 32 facing the radially outer end of the turbine 18 are provided on the exit of the burner 19.

A plurality (24 in the embodiment) of heat pipes 33 placed in a radial form around the rotating shaft 14, are supported on the rear face of the inner wall 31 of the compressed air passage 28 by support plates 34. The radially inner parts of the heat pipes 33 which are positioned between the compressor 17 and the turbine 18 form evaporation sections 33a facing the outer periphery of the rotating shaft 14. The radially outer parts of the heat pipes 33 run through the inner wall 31 and then change their direction by 90° towards the rear inside the compressed air passage 28, and these parts form condensation sections 33b. The condensation sections 33b positioned inside the compressed air passage 28, together with the diffusers 30 positioned on the upstream end of the compressed air passage 28, exhibit the function of converting the kinetic energy of the air compressed by the compressor 17 into pressure energy.

Figure 6:
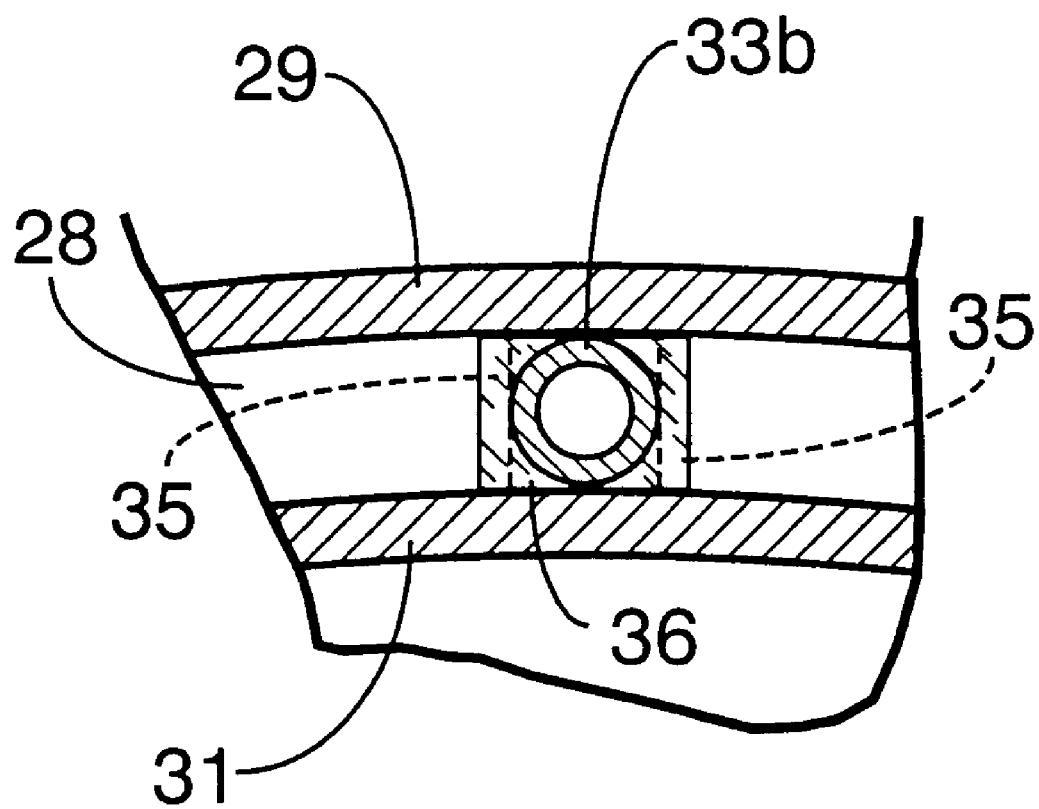
FIG. 6 is a magnified cross sectional view at line 6—6 in FIG. 1.

As is clear from FIGS. 4 and 6, the two sides in the circumferential direction of each of the heat pipes 33 positioned inside the compressed air passage 28 are interposed between a pair of partitions 35. These partitions 35 are connected to the outer wall 29 and the inner wall 31 of the compressed air passage 28 and the gaps between the upstream ends of the partitions 35 and the heat pipe 33, are covered with a blocking plate 36. This can prevent the flow of air from being disturbed by the air passing through the four spaces having an almost triangular cross section formed between the outer wall 29, the inner wall 31 and the heat pipe 33, and the condensation section 33b of the heat pipe 33 can thus function effectively as a diffuser.

The structure of the heat pipe 33 is known. An operating fluid such as caesium, rubidium, potassium, sodium or mercury is enclosed inside a pipe having its two ends blocked, the pipe being made from, for example, copper, and the inner wall of the pipe is lined with a porous wick material that absorbs the operating fluid well. In the case where the heat pipes 33 contain a liquid (fluid), since it is necessary for the evaporation sections 33a to be positioned lower than the condensation sections 33b, it is necessary for the rotating shaft 14 of the gas turbine engine E to be positioned along the direction of gravity and for the compressor 17 to be positioned on the lower side.

The action of the embodiment having the above-described arrangement is explained below.

When the gas turbine engine E is in operation, air compressed by the compressor 17 is supplied to the burner 19 via the compressed air passage 28 and mixed with the fuel injected from the fuel injection nozzles 24 in the burner 19 to effect combustion, and the combustion gas so generated, drives the turbine 18. When the turbine 18 rotates, the compressor 17 and generator G which share the rotating shaft 14 with the turbine 18, are driven.

The turbine 18 is exposed to the combustion gas emitted from the burner 19 during its operation, its temperature increases, and if the heat of the turbine 18 is transmitted to the compressor 17 its compression efficiency will be degraded. In particular, an increase in the temperature at the entrance side of the compressor 17 is the main factor in significantly degrading the compression efficiency. On the other hand, the air sent to the compressed air passage 28 on the exit side of the compressor 17 has a higher temperature and higher pressure than the air on the entrance side, and if the temperature of the air is further raised before supplying the air to the burner 19, the performance of the gas turbine engine E can be further enhanced. In the present embodiment, the heat of the turbine 18 side, is insulated by the heat pipes 33 so that it is not transmitted to the compressor 17 side which is axially forward relative to the turbine 18 side, and the heat of the turbine 18 side is actively transmitted to the compressed air passage 28 which is radially outside relative to the turbine 18 so as to further heat the air that is supplied to the burner 19.

The action is explained in detail below. When the heat of the turbine 18 which is at a high temperature is transmitted to the evaporation sections 33a of the heat pipes 33, the evaporation sections 33a are deprived of their heat by the operating fluid, which is thereby vaporized, and the vapor moves radially outwards inside the heat pipes 33 and reaches the condensation sections 33b. The vapor is deprived of its heat by the air passing inside the compressed air passage 28 and having a comparatively low temperature thereby condensing in the condensation sections 33b, and the liquefied operating fluid is returned to the evaporation sections 33a by the capillary action of the wick.

Since the evaporation sections 33a of the heat pipes 33 are thus positioned between the compressor 17 and the turbine 18, the heat of the compressor 17 side can be insulated so that it does not migrate to the turbine 18 side, thereby preventing the compression efficiency of the compressor 17 from being degraded. Moreover, the heat removed from the turbine 18 side in the evaporation sections 33a of the heat pipes 33 is released into the compressed air passage 28 via the condensation sections 33b so heating the air passing through the passage 28 and the combustion efficiency in the burner 19 can thus be enhanced.

Since a large number of the evaporation sections 33a of the heat pipes 33 are positioned to surround the rotating shaft 14 between the compressor 17 and the turbine 18, an air bearing is formed between the inner periphery of the evaporation sections 33a of the heat pipes 33 and the outer periphery of the rotating shaft 14, effectively suppressing oscillation of the rotating shaft 14. Moreover, since the rotating shaft 14 is supported by the air bearing, it is unnecessary to provide accessories such as an oil pump for supplying lubricating oil and the size of the gas turbine engine E can be further reduced.

Figure 7:
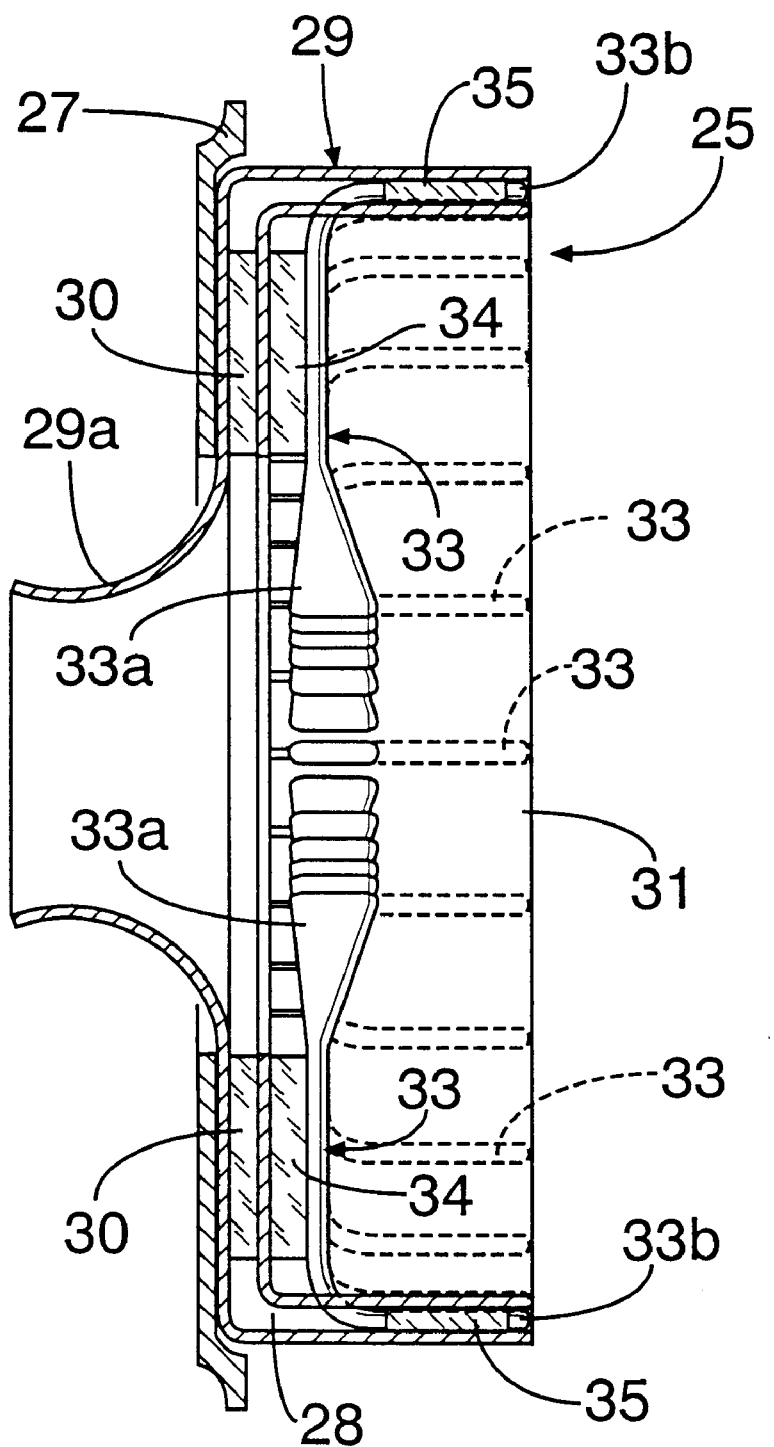
FIG. 7 is a longitudinal section view of a heat exchanger unit of a second embodiment of the present invention.

A second embodiment of the present invention is explained below by reference to FIG. 7.

The second embodiment is an improvement of the first embodiment, and the area of each of the evaporation sections 33a of the heat pipes 33 facing the outer periphery of the rotating shaft 14 is increased by increasing the diameter of the evaporation sections 33a in the axial direction. In accordance with this arrangement, the force provided by the air bearing for supporting the rotating shaft 14 can be enhanced.

Figure 8:
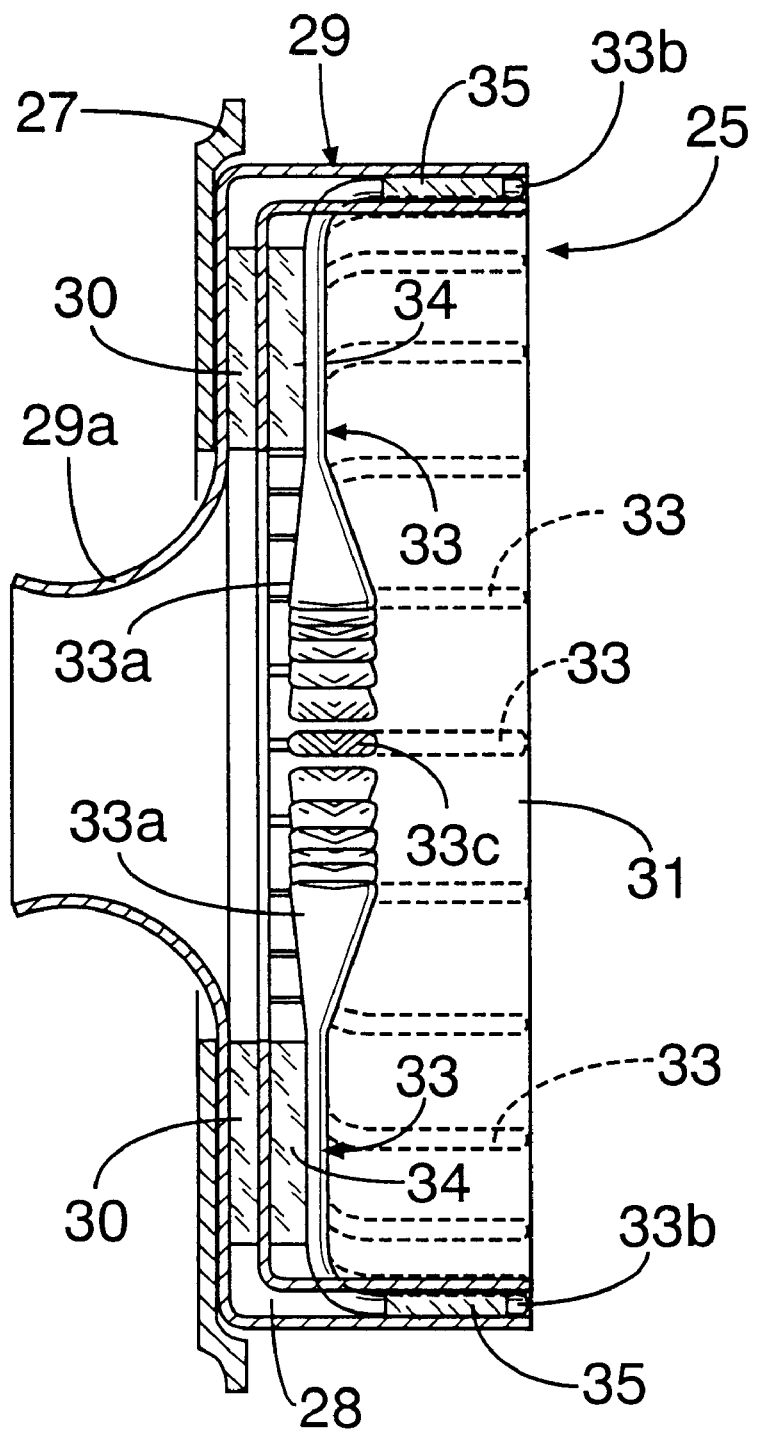
FIG. 8 is a longitudinal section view of a heat exchanger unit of a third embodiment of the present invention.

A third embodiment of the present invention is explained below by reference to FIG. 8.

The third embodiment is an improvement of the second embodiment (FIG. 7), and a large number of channels 33c inclined towards the circumferential direction, are formed on the inner periphery of the evaporation sections 33a of the heat pipes 33 which have an increased cross section in the axial direction. In accordance with this arrangement, the repulsive force of the air membrane of the air bearing can be increased thereby further enhancing the force with which the rotating shaft 14 is supported. With regard to the form of the channels, it is possible to employ a herringbone pattern having a series of V-shaped channels or a partially channelled form in which a first group of channels and a second group of channels inclined in opposite directions to each other, are placed to be separate from each other in the axial direction. It is also possible to form the channels 33c in a direction orthogonal to the circumferential direction (the axial direction).

Figure 9:
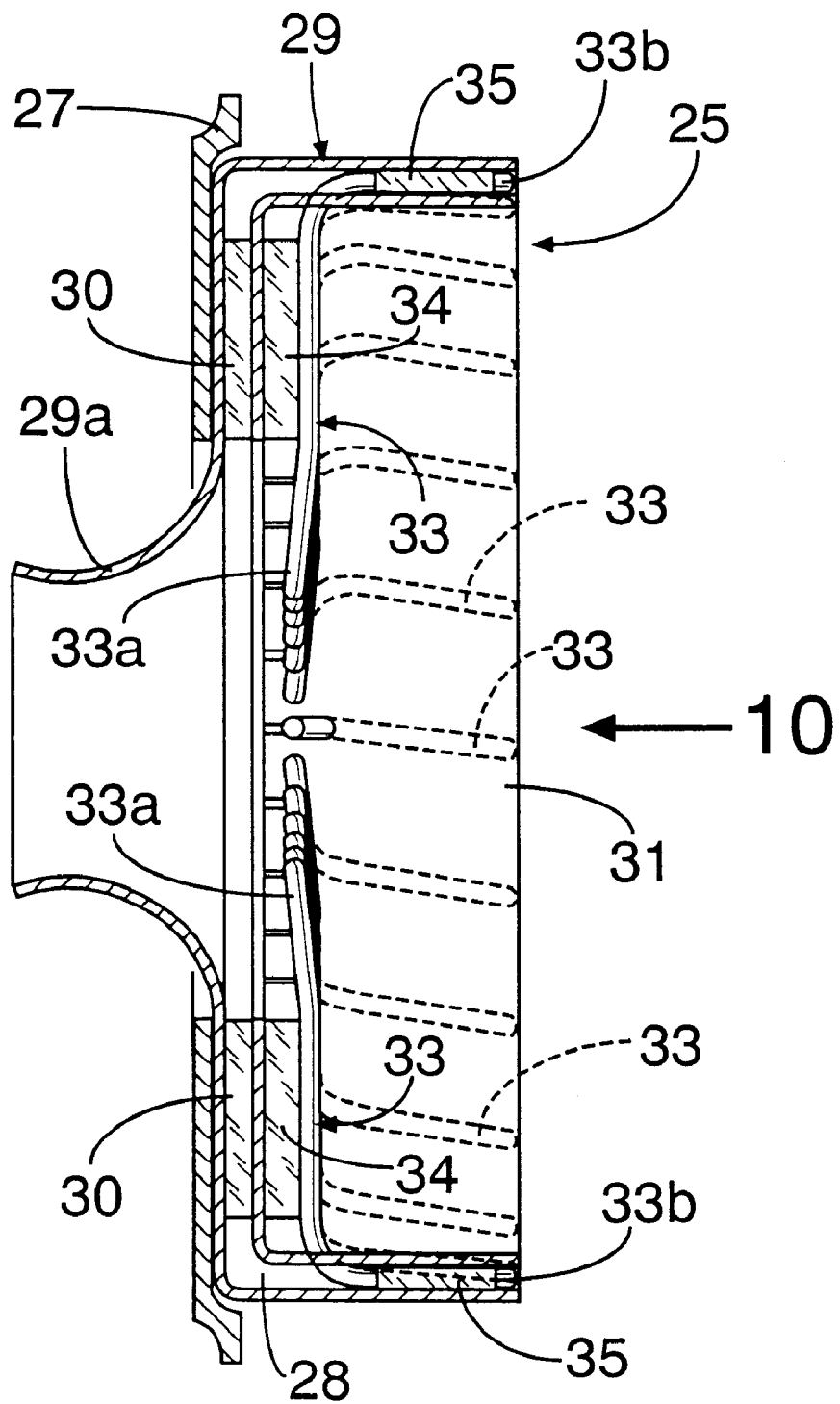
FIG. 9 is a longitudinal section view of a heat exchanger unit of a fourth embodiment of the present invention.
Figure 10:
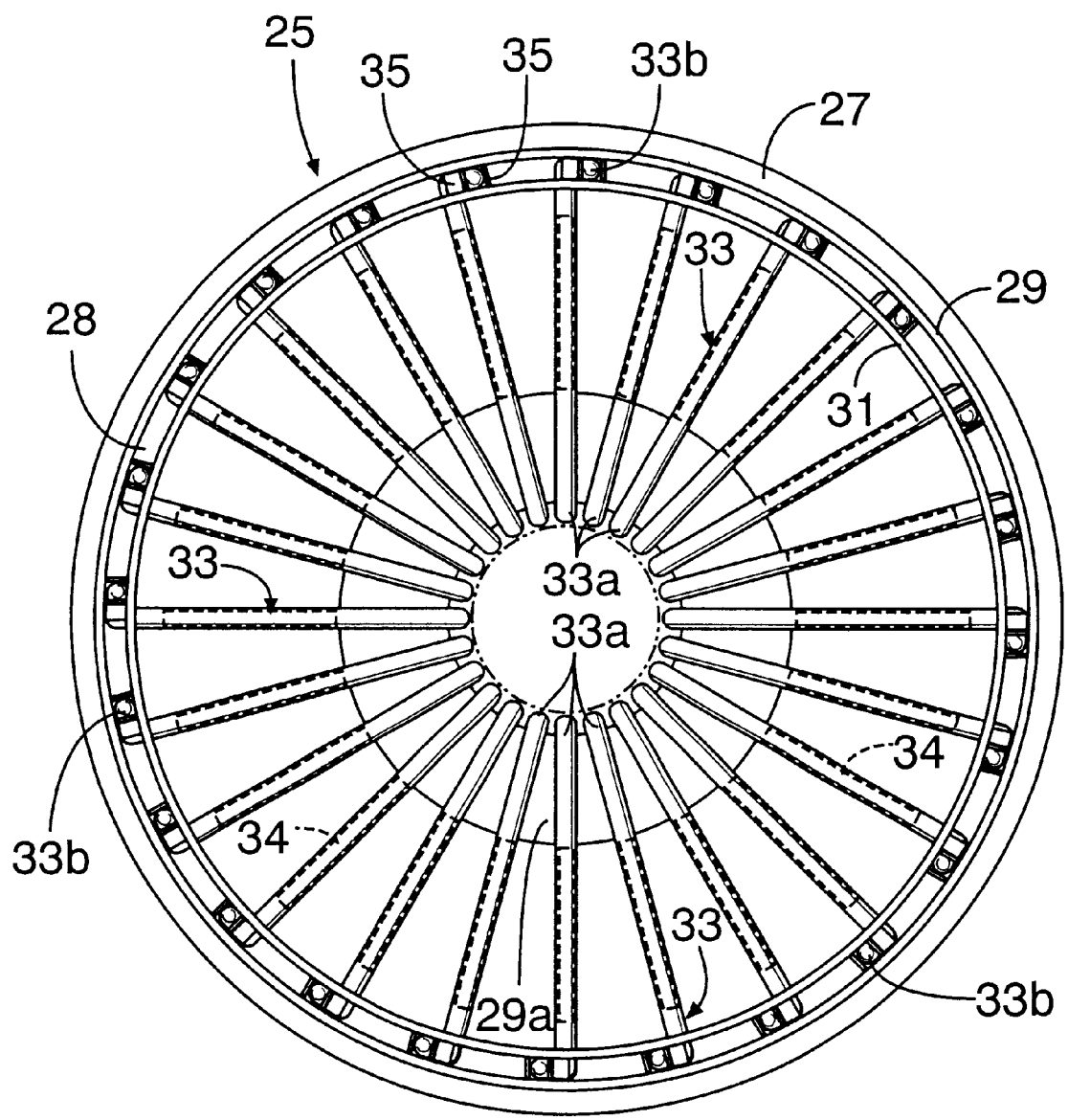
FIG. 10 is a view from arrow 10 in FIG. 9.

A fourth embodiment of the present invention is explained below by reference to FIGS. 9 and 10.

The fourth embodiment is an improvement of the first embodiment, and the condensation sections 33b of the heat pipes 33 extending inside the compressed air passage 28 are arranged to be inclined in a spiral manner around the axis of the rotating shaft 14. In accordance with this arrangement, the length of each of the condensation sections 33b of the heat pipes 33 inside the compressed air passage 28, is increased thereby increasing the opportunity for the air to come to contact with the condensation sections 33b. The heat exchange efficiency can thus be enhanced and the air that is to be supplied to the burner 19 can be heated effectively.

Figure 11:
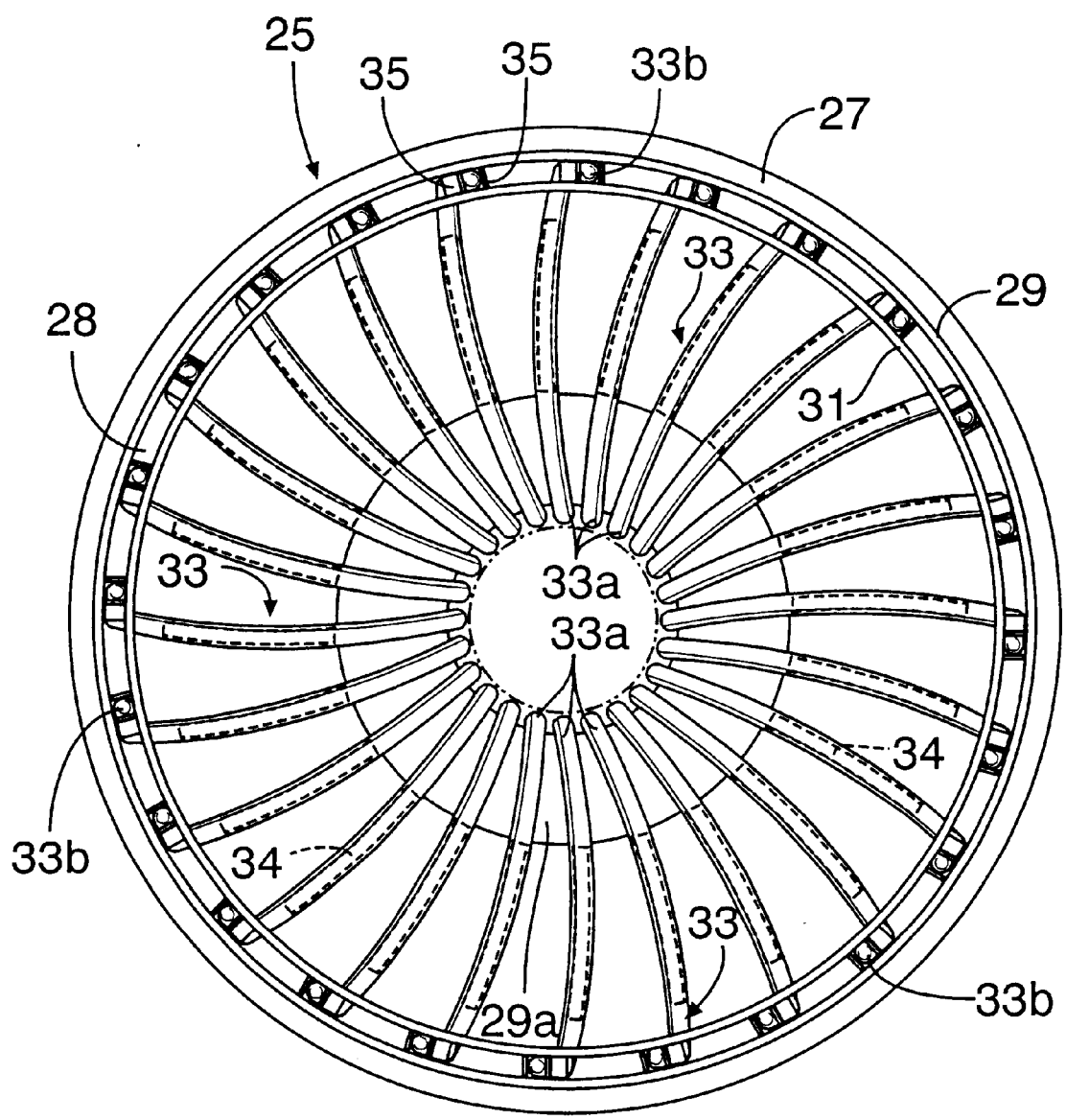
FIG. 11 is a longitudinal section view of a heat exchanger unit of a fifth embodiment of the present invention.

A fifth embodiment of the present invention is explained below by reference to FIG. 11.

The fifth embodiment is an improvement of the fourth embodiment (FIGS. 9 and 10), and the parts of the heat pipes 33 extending radially around the rotating shaft 14, that is, the parts between the evaporation sections 33a and the position prior to the condensation sections 33b, are curved in the circumferential direction in a whirling manner. In accordance with this arrangement, since the length of each of the evaporation sections 33a of the heat pipes 33 interposed between the compressor 17 and the turbine 18 increases, the heat of the turbine 18 side can be absorbed yet more effectively and prevented from being transmitted to the compressor 17 side.

Figure 12:
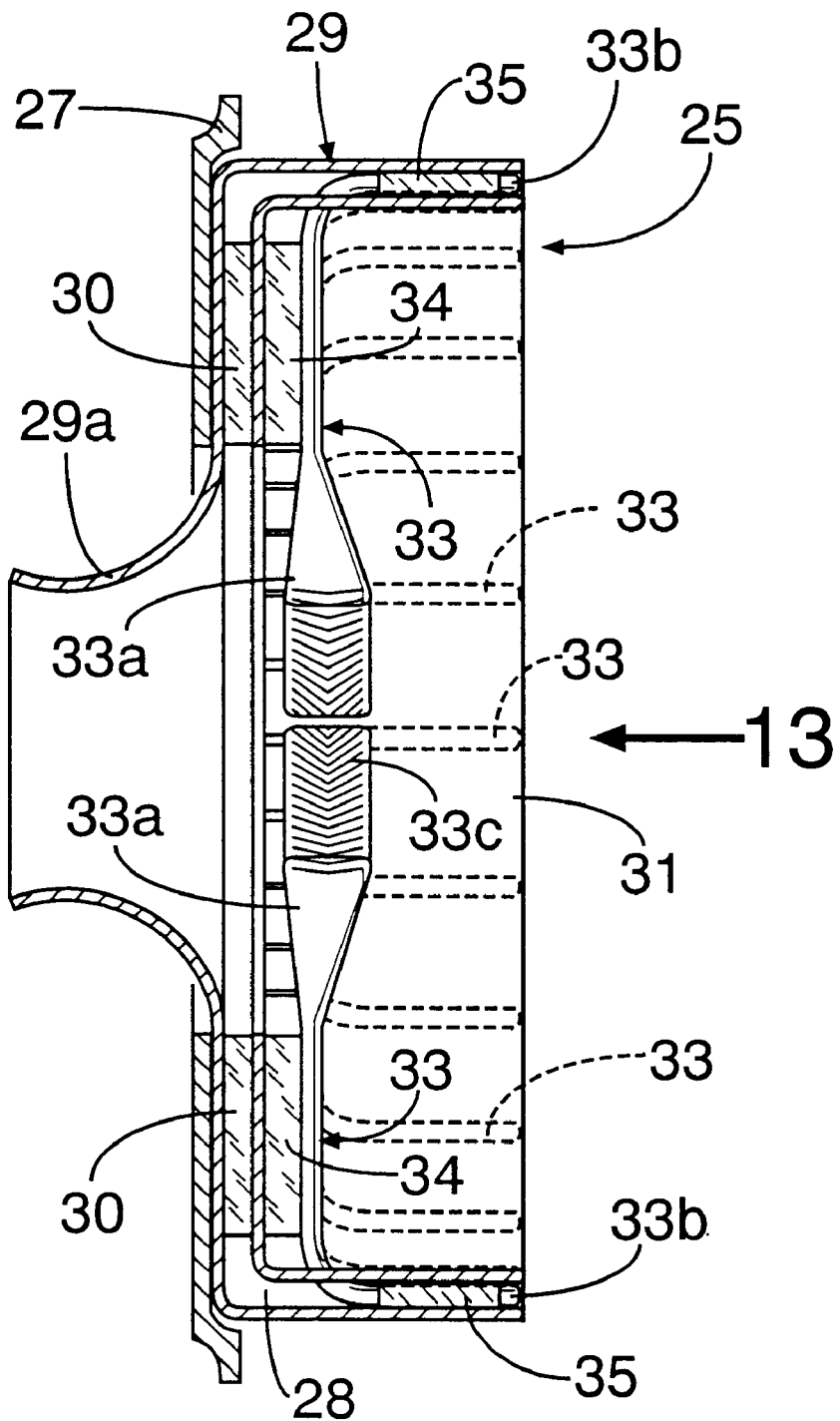
FIG. 12 is a longitudinal section view of a heat exchanger unit of a sixth embodiment of the present invention.
Figure 13:
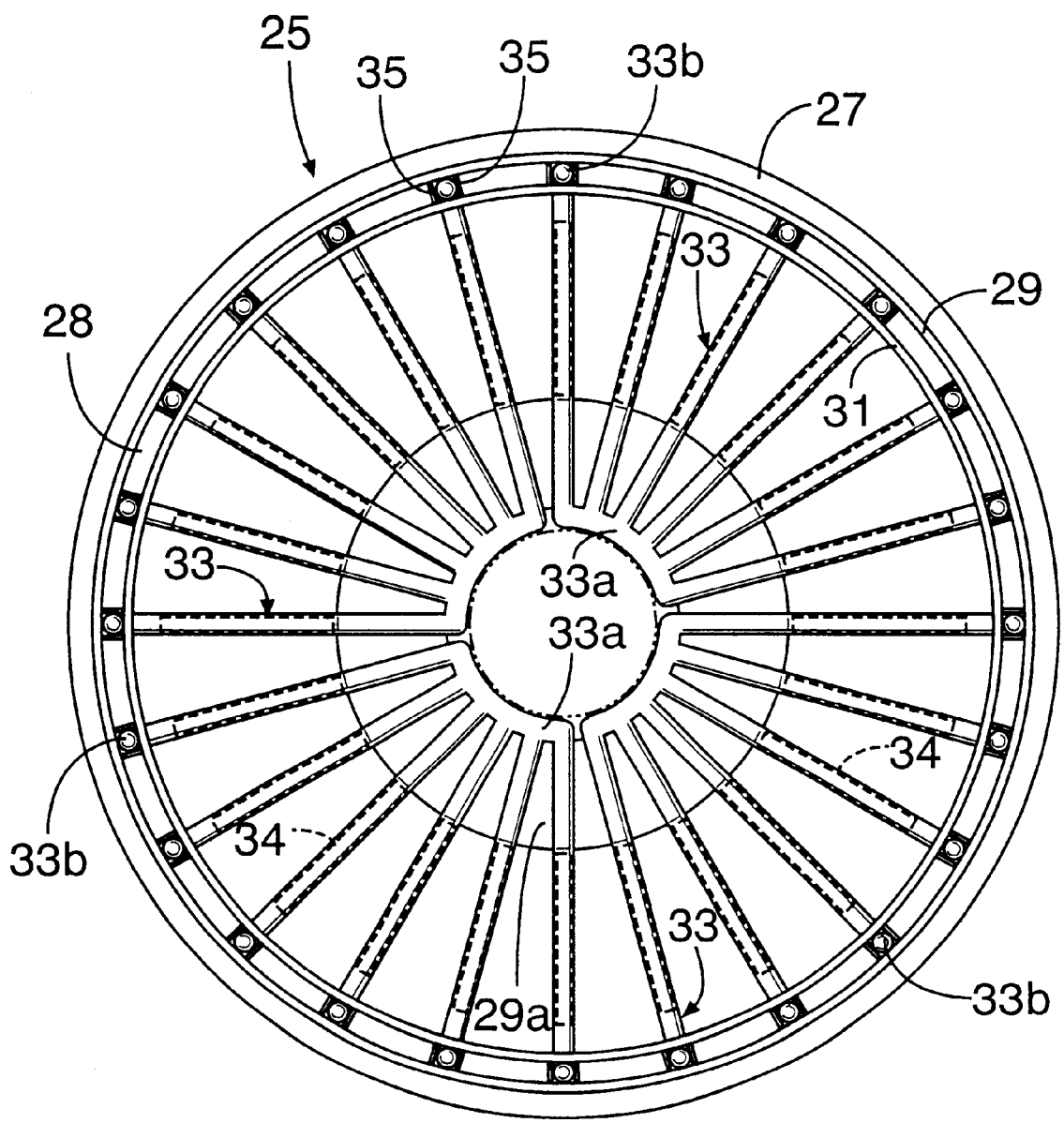
FIG. 13 is a view from arrow 13 in FIG. 12.

A sixth embodiment of the present invention is explained below by reference to FIGS. 12 and 13.

The sixth embodiment is an improvement of the third embodiment (FIG. 8), and the evaporation sections 33a of six adjacent heat pipes 33 communicate with each other, and four groups, each comprising six heat pipes 33, each are positioned at intervals of 90° in the circumferential direction. The evaporation sections 33a that communicate with each other are formed to be wider in the axial direction of the rotating shaft 14, and a large number of channels 33c having a herringbone pattern or another pattern are formed on the air bearing facing the outer periphery of the rotating shaft 14. In accordance with this arrangement, the operating fluid can be circulated among the six heat pipes 33 transmitting the heat uniformly from the evaporation sections 33a to the condensation sections 33b. Since there are fewer discontinuities along the inner periphery of the evaporation sections 33a facing the outer periphery of the rotating shaft 14, the ability to support the rotating shaft 14 can be further enhanced in synergy with the effect of the channels 33c.

Figure 14:
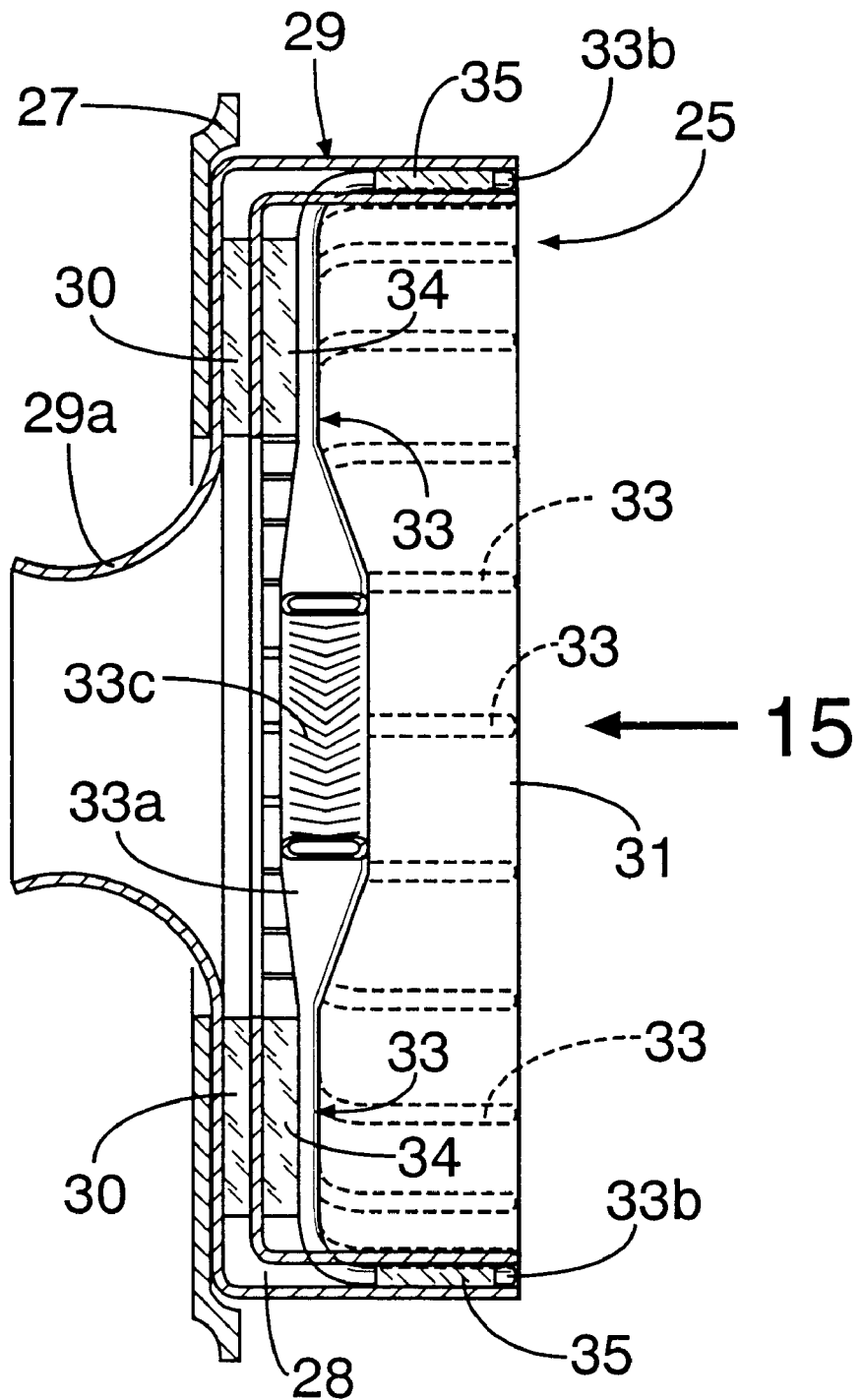
FIG. 14 is a longitudinal section view of a heat exchanger unit of a seventh embodiment of the present invention.
Figure 15:
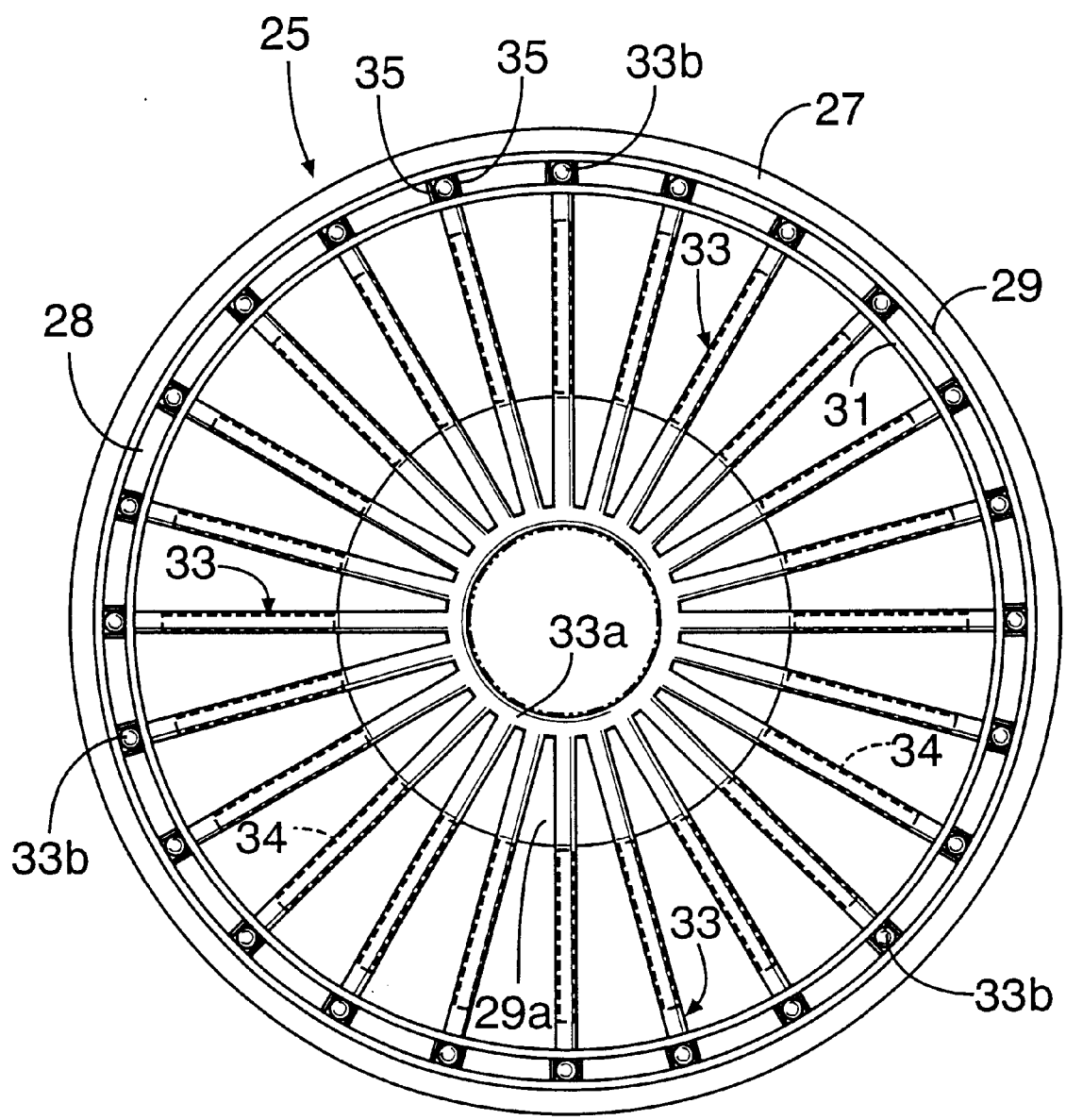
FIG. 15 is a view from arrow 15 in FIG. 14.

A seventh embodiment of the present invention is explained below by reference to FIGS. 14 and 15.

The seventh embodiment is an improvement of the sixth embodiment (FIGS. 12 and 13), and the evaporation sections 33a of all twenty four heat pipes 33 communicate with each other. In accordance with this arrangement, the operating fluid can be circulated among the twenty four heat pipes 33 thus transmitting the heat yet more uniformly from the evaporation sections 33a to the condensation sections 33b, and since there are no discontinuities along the inner periphery of the evaporation sections 33a facing the outer periphery of the rotating shaft 14, the performance of the air bearing can be further enhanced. In the present embodiment it is necessary to separate the rotating shaft 14 between the compressor 17 and the turbine 18 to enable assembly to be carried out.

Figure 16:
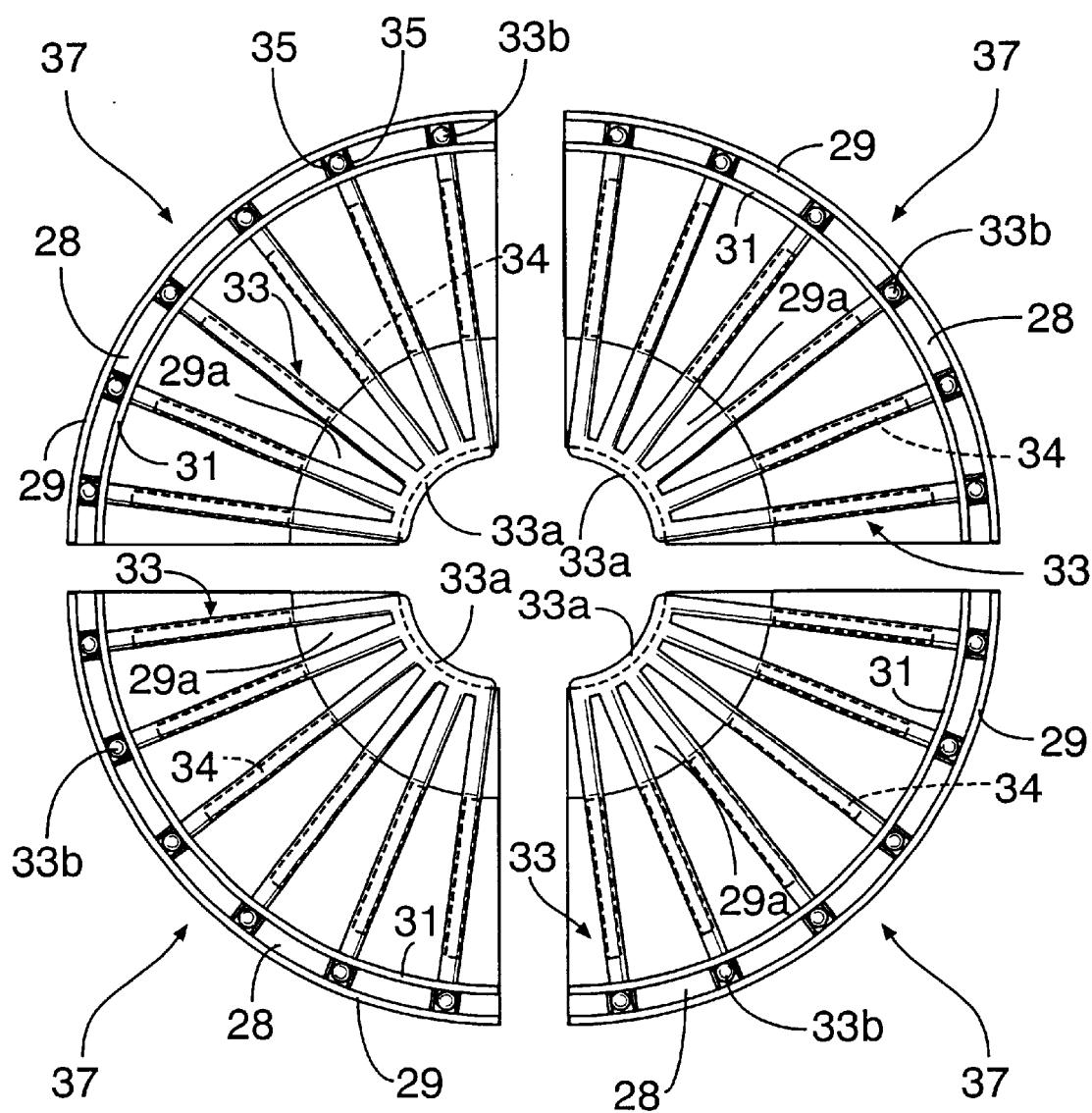
FIG. 16 is an exploded rear view of a heat exchanger unit of a eighth embodiment of the present invention.

A eighth embodiment of the present invention is explained below by reference to FIG. 16.

The eighth embodiment is an improvement of the sixth embodiment (FIGS. 12 and 13), and the compressed air passage 28, the outer wall 29, the diffusers 30 and the inner wall 31 of the heat pipe unit 25 excluding the substrate 27, are divided into four modules 37 having a central angle of 90° by a plane that includes the rotating shaft 14. In accordance with this arrangement, the heat pipe unit 25 can be assembled easily.

The gas turbine engine E of the present invention can be used for any purpose apart from that of driving a generator G. In the embodiments described, a centrifugal type of the turbine 18 is illustrated, but it may be of an axial flow type. Moreover, in the eighth embodiment the heat pipe unit 25 is divided into four modules 37 but it may be divided into 2, 3, 5 or more modules.

In accordance with the present invention, it is possible to absorb the heat on the turbine side by means of the evaporation sections of the heat pipes thus preventing the heat from being transmitted to the compressor side and thereby suppressing degradation in the air compression efficiency of the compressor. Moreover, it is possible to transmit the heat on the turbine side to the compressed air passage via the condensation sections, thereby heating the air passing through the passage to enhance the combustion efficiency in the burner.

In accordance with the present invention, oscillation of the rotating shaft can be suppressed by the air bearing and the rotating shaft can rotate smoothly. Moreover, the engine becomes oil-less due to the use of the air bearing and it becomes unnecessary to use accessories such as an oil pump so further reducing the size.

In accordance with the present invention, the repulsive force of the air membrane of the air bearing can be increased by the large number of channels formed on the inner periphery of the evaporation sections thereby enhancing the performance in supporting the rotating shaft.

In accordance with the present invention, since the area over which the outer periphery of the rotating shaft and the inner periphery of the evaporation sections of the heat pipes forming the air bearing, face each other, increases, the performance in supporting the rotating shaft can be enhanced.

In accordance with the present invention, the operating fluid is able to move among a plurality of heat pipes and each of the heat pipes can exhibit an equal heat transport performance.

In accordance with the present invention, the operating fluid is able to move among all of the plurality of heat pipes and each of the heat pipes can exhibit a more equal heat transport performance.

In accordance with the present invention, since the condensation sections themselves of the heat pipes in the compressed air passage form diffusers, a diffuser function can be exhibited without increasing the number of parts.

In accordance with the present invention, the ability to absorb heat can be enhanced by increasing the length of the evaporation sections of the heat pipes and the thermal insulating of the compressor from the turbine can be carried out effectively.

In accordance with the present invention, the heat release performance can be enhanced by increasing the length of the condensation sections of the heat pipes and the air passing through the compressed air passage can be heated effectively.

In accordance with the present invention, since the compressed air passage and the heat pipes are divided into a plurality of modules, the ease of assembly when assembling them on the outer periphery of the rotating shaft can be enhanced.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A gas turbine engine comprising a centrifugal compressor for compressing air that is drawn into the compressor, a compressed air passage, a burner, the burner being supplied with air compressed by the compressor through the compressed air passage, a turbine, the turbine being driven by combustion gas generated in the burner, a rotating shaft, the compressor and the turbine being positioned on the rotating shaft adjacent to each other in an axial direction of the rotating shaft, and a plurality of radially-arranged heat pipes, wherein each heat pipe has an evaporation section on a radially inner part thereof which faces an outer periphery of the rotating shaft between the compressor and the turbine and a condensation section on a radially outer part thereof which faces the compressed air passage.

2. A gas turbine engine according to claim 1, wherein an air bearing is formed between an inner periphery of the evaporation sections of the heat pipes and the outer periphery of the rotating shaft.

3. A gas turbine engine according to claim 2, wherein a plurality of channels inclined towards or orthogonal to the circumferential direction, are formed on the inner periphery of the evaporation sections of the heat pipes.

4. A gas turbine engine according to claim 3, wherein a width of the inner periphery of the evaporation sections of the heat pipes facing the outer periphery of the rotating shaft is increased in the axial direction of the rotating shaft.

5. A gas turbine engine according to claim 2, wherein a width of the inner periphery of the evaporation sections of the heat pipes facing the outer periphery of the rotating shaft is increased in the axial direction of the rotating shaft.

6. A gas turbine engine according to any one of claims 1 to 5, wherein the evaporation sections of at least two adjacent heat pipes communicate with each other.

7. A gas turbine engine according to any one of claims 1 to 5, wherein the evaporation sections of all the heat pipes communicate with each other.

8. A gas turbine engine according to any one of claims 1 to 5, wherein the condensation sections of the heat pipes in the compressed air passage, form diffusers.

9. A gas turbine engine according to any one of claims 1 to 5, wherein the evaporation sections of the heat pipes extending radially between the compressor and the turbine, are curved in the circumferential direction.

10. A gas turbine engine according to any one of claims 1 to 5, wherein the condensation sections of the heat pipes in the compressed air passage, are curved in the circumferential direction.

11. A gas turbine engine according to any one of claims 1 to 5, wherein the compressed air passage and the heat pipes are divided into a plurality of modules.

* * * * *